United States Patent [19]
Kojima et al.

[11] Patent Number: 5,612,880
[45] Date of Patent: Mar. 18, 1997

[54] PROCESS FOR CONTROLLING TRAVEL STATE DURING BRAKING IN VEHICLE

[75] Inventors: Takeshi Kojima; Toshio Yahagi; Kazuaki Fukami; Syouji Suzuki; Kunimichi Hatano, all of Wako, Japan

[73] Assignee: Honda Giken Kogyo Kabushiki Kaisha, Tokyo, Japan

[21] Appl. No.: 377,086

[22] Filed: Jan. 26, 1995

[30] Foreign Application Priority Data

Jan. 26, 1994 [JP] Japan ................................. 6-007205

[51] Int. Cl.$^6$ ................................. B60T 8/66; B60T 8/58; B60K 17/34
[52] U.S. Cl. ................................. 364/426.019; 180/233; 303/190; 303/170
[58] Field of Search ................................. 364/426.01, 426.02; 180/248, 249, 233; 303/143, 167, 168, 177, 176, 190, 171, 170, 160

[56] References Cited

U.S. PATENT DOCUMENTS

| | | | |
|---|---|---|---|
| 4,765,429 | 8/1988 | Sato | 180/197 |
| 4,770,266 | 9/1988 | Yamaguchi et al. | 180/197 |
| 4,962,970 | 10/1990 | Jonner et al. | 303/100 |
| 4,980,831 | 12/1990 | Katayama et al. | 364/426.02 |
| 4,991,679 | 2/1991 | Fujii et al. | 180/233 |
| 5,014,809 | 5/1991 | Matsuda | 180/248 |
| 5,019,985 | 5/1991 | Yasuno et al. | 364/426.02 |
| 5,119,900 | 6/1992 | Watanabe et al. | 180/245 |
| 5,282,138 | 1/1994 | Sano | 364/426.03 |
| 5,307,274 | 4/1994 | Takata et al. | 364/426.01 |

FOREIGN PATENT DOCUMENTS

3721626C2  9/1991  Germany.

*Primary Examiner*—Michael Zanelli
*Attorney, Agent, or Firm*—Nikaido, Marmelstein, Murray & Oram LLP

[57] ABSTRACT

A method of controlling the driving state of a vehicle in which an antilock brake control for eliminating a locking tendency of a wheel during braking can be carried out, and a four-wheel drive state and a two-wheel drive state can be switched from one to another. A monitored estimated vehicle speed is calculated on the basis of highest one of wheel speeds of the vehicle wheels and a value is detected by a longitudinal acceleration/deceleration sensor for detecting a longitudinal acceleration or deceleration of a vehicle speed, and a judgement speed is determined at a value lower than the monitored estimated vehicle speed. The vehicle speed is also independently determined based upon the speed of each of the vehicle wheels. The four-wheel drive state is switched to the two-wheel drive state in response to highest one of vehicle speeds independently calculated on the basis of the wheel speeds becoming equal to or less than the judgement speed in the four-wheel drive state. Thus, when the brake depression force is small, the four wheels are prevented from gradually falling into their locked states, with the four-wheel drive state being maintained when the antilock brake control is not carried out.

4 Claims, 11 Drawing Sheets

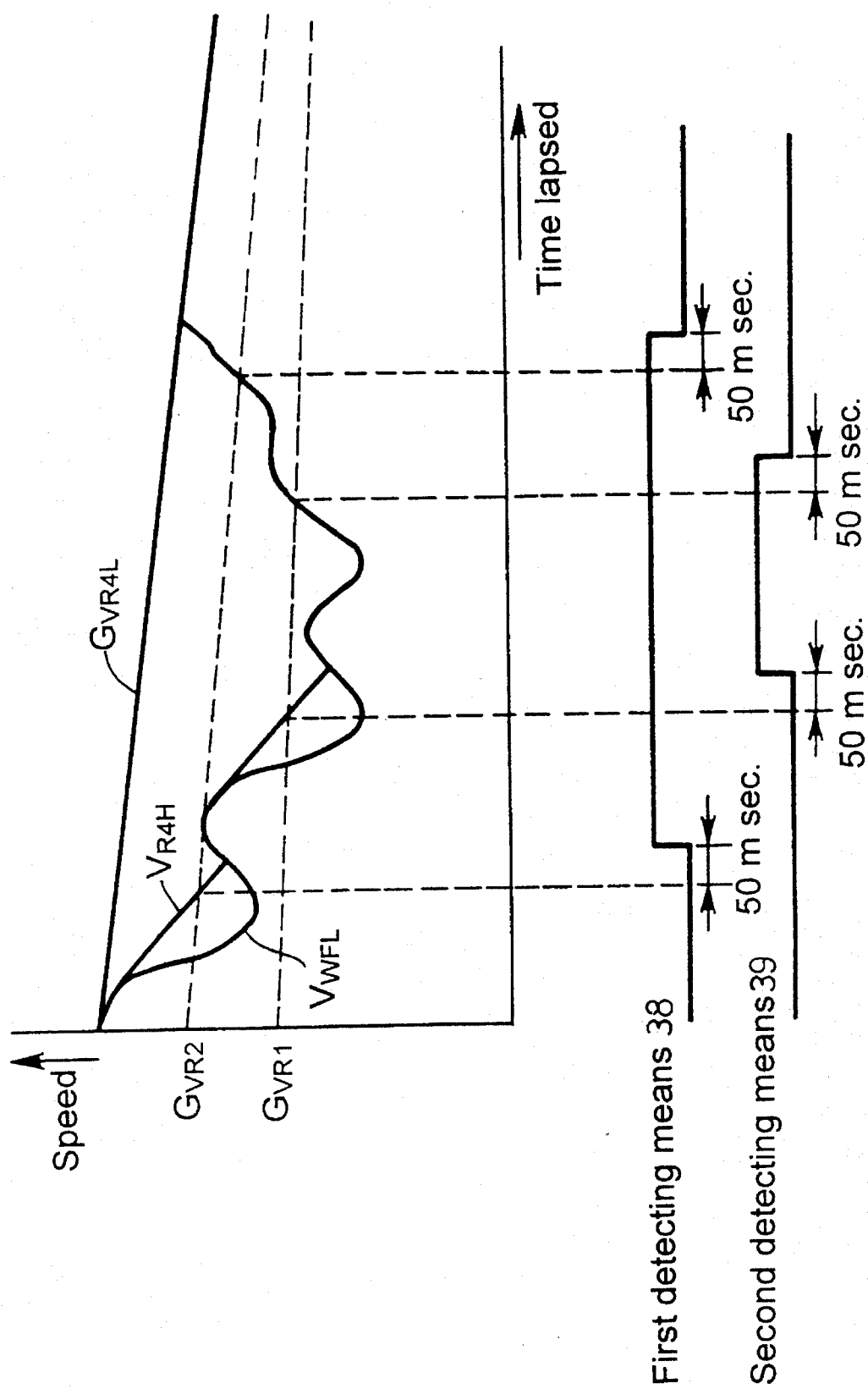

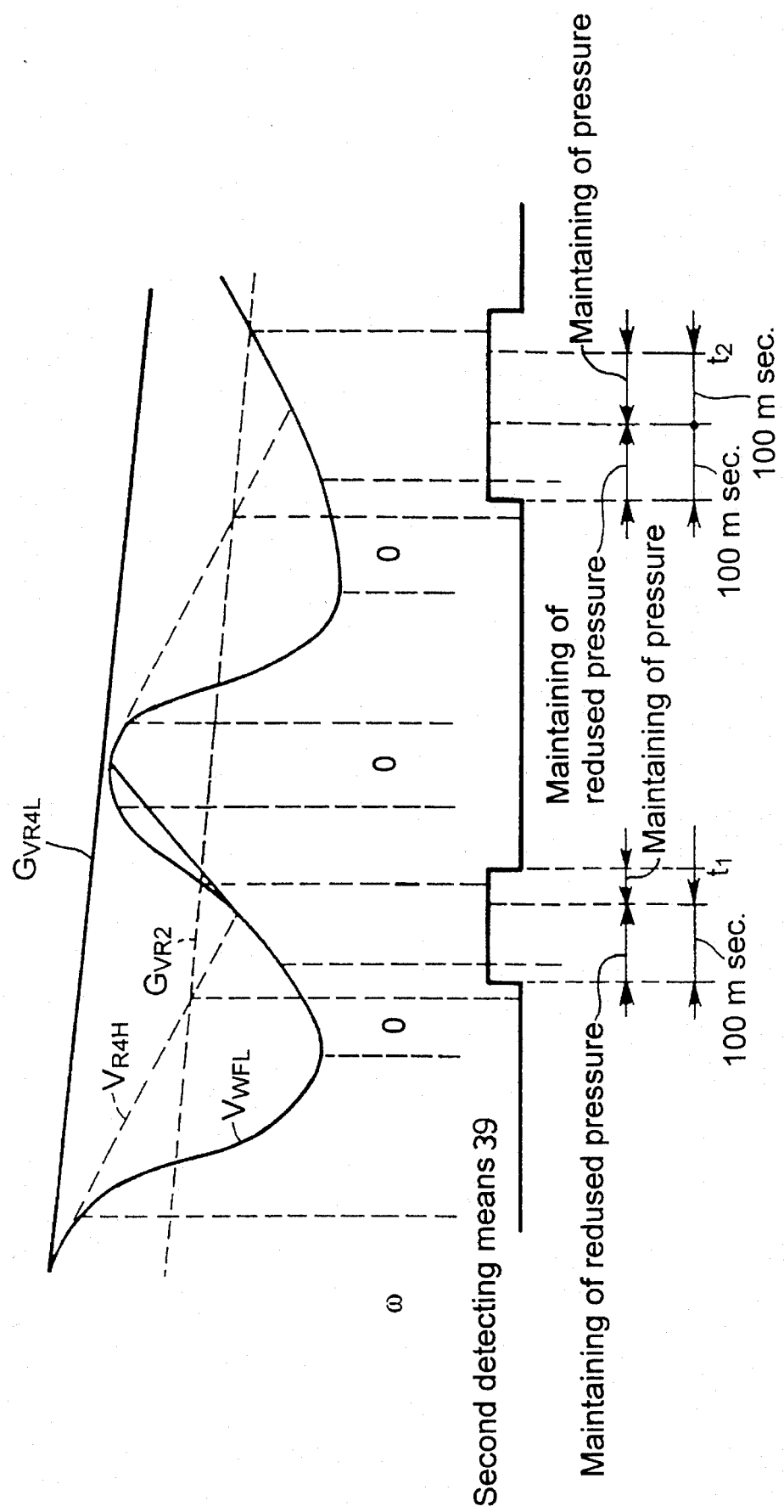

PROCESS FOR CONTROLLING TRAVEL STATE DURING BRAKING IN VEHICLE

BACKGROUND OF THE INVENTION

1. Field of the Invention

The present invention relates to a process for controlling a travel state of a vehicle during braking, in which it is possible to perform an antilock brake control for eliminating a locking tendency of a wheel during braking, and to switch between a four-wheel drive state and a two-wheel drive state.

2. Description of the Prior Art

Such a process is conventionally known, for example, from Japanese Patent Application Laid-open No. 43325/87, in which the control of switching from the four-wheel drive state to the two-wheel drive state can be carried out during execution of the antilock brake control.

In a condition when all the four wheels are driven during execution of the antilock brake control, such a switching control is carried out because of a disadvantage produced due to the fact that braking forces for wheels interfere with one another during execution of the antilock brake control. However, when a depression force for depression of a brake pedal in the four-wheel drive state is small, all the four wheels may gradually fall into their locked states with the antilock brake control remaining not operating, i.e., with the four-wheel drive state being maintained. Even when the switching from the four-wheel drive state to the two-wheel drive state is not operating due to a problem such as breaking of a signal line or a problem in the actuation of switching the drive state, notwithstanding that the antilock brake control is operating, the four wheels may gradually fall into their locked states.

SUMMARY OF THE INVENTION

Accordingly, it is an object of the present invention to prevent the four wheels from gradually falling into their locked states during braking.

To achieve the above object, according to an aspect and feature of the present invention, there is provided a process for controlling a travel state of a vehicle during braking in which the antilock brake control for eliminating a locking tendency of a wheel during braking can be carried out, and a four-wheel drive state and a two-wheel drive state can be switched from one to another, comprising the steps of: calculating a monitored estimated vehicle speed on the basis of highest one of wheel speeds of the vehicle wheels and a detection value detected by a longitudinal acceleration/deceleration sensor which detects a longitudinal acceleration or deceleration of a vehicle speed, and determining a judgement speed at a value lower than the monitored estimated vehicle speed, whereby the four-wheel drive state is switched to the two-wheel drive state in response to highest one of the estimated vehicle speeds independently calculated on the basis of the wheel speeds, becoming equal to or lower than the judgement speed in the four-wheel drive state.

With the above feature, when the brake depression force is small, the four wheels are prevented from gradually falling into their locked state in the four-wheel drive state in which the antilock brake control is not carried out.

In addition, to achieve the above object, according to another aspect and feature of the invention, there is provided a process for controlling a travel state of a vehicle during braking in which an antilock brake control for eliminating a locking tendency of a wheel during braking can be carried out, and a drive state can be switched from a four-wheel drive state to a two-wheel drive state during execution of antilock brake control, comprising the steps of: calculating a monitored estimated vehicle speed on the basis of the highest of the wheel speeds of the wheels and a detection value detected by a longitudinal acceleration/deceleration sensor which detects a longitudinal acceleration or deceleration of a vehicle body, and determining a judgement speed at a value lower than the monitored estimated vehicle speed, whereby the antilock brake control in which a braking pressure is reduced is carried out in response to highest one of estimated vehicle speeds independently calculated on the basis of the wheel speeds becoming equal to or lower than the judgement speed.

With the above feature, the four wheels can be prevented from gradually falling into their locked state, by detecting that the four wheels are about to gradually fall into their locked states during execution of an antilock brake control, and conducting a pressure-reducing control with an increased degree of reduction in pressure.

Further, to achieve the above object, according to another aspect and feature of the present invention, there is provided a process for controlling a travel state of a vehicle during braking in which an antilock brake control for eliminating a locking tendency of a wheel during braking can be carried out, and the drive state can be switched from a four-wheel drive state to a two-wheel drive state during execution of the antilock brake control, wherein when the drive state is maintained in the four-wheel drive state during execution of the antilock brake control, the antilock brake control in which a braking pressure is further reduced is carried out.

With the above feature, the four wheels can be prevented from gradually falling into their locked state, even in the four wheel driving state during the execution of the antilock brake control.

The above and other objects, features and advantages of the invention will become apparent from the following description of a preferred embodiment taken in conjunction with the accompanying drawings.

BRIEF DESCRIPTION OF THE DRAWINGS

FIG. 10 is a diagram for explaining the detection of a condition in which the four wheels are about to gradually fall into their locked states; and FIG. 11 is a diagram for explaining an antilock brake control with an increased degree of reduction in braking pressure.

DESCRIPTION OF THE PREFERRED EMBODIMENT

The present invention will now be described by way of a preferred embodiment with reference to the accompanying drawings.

Figure 1:
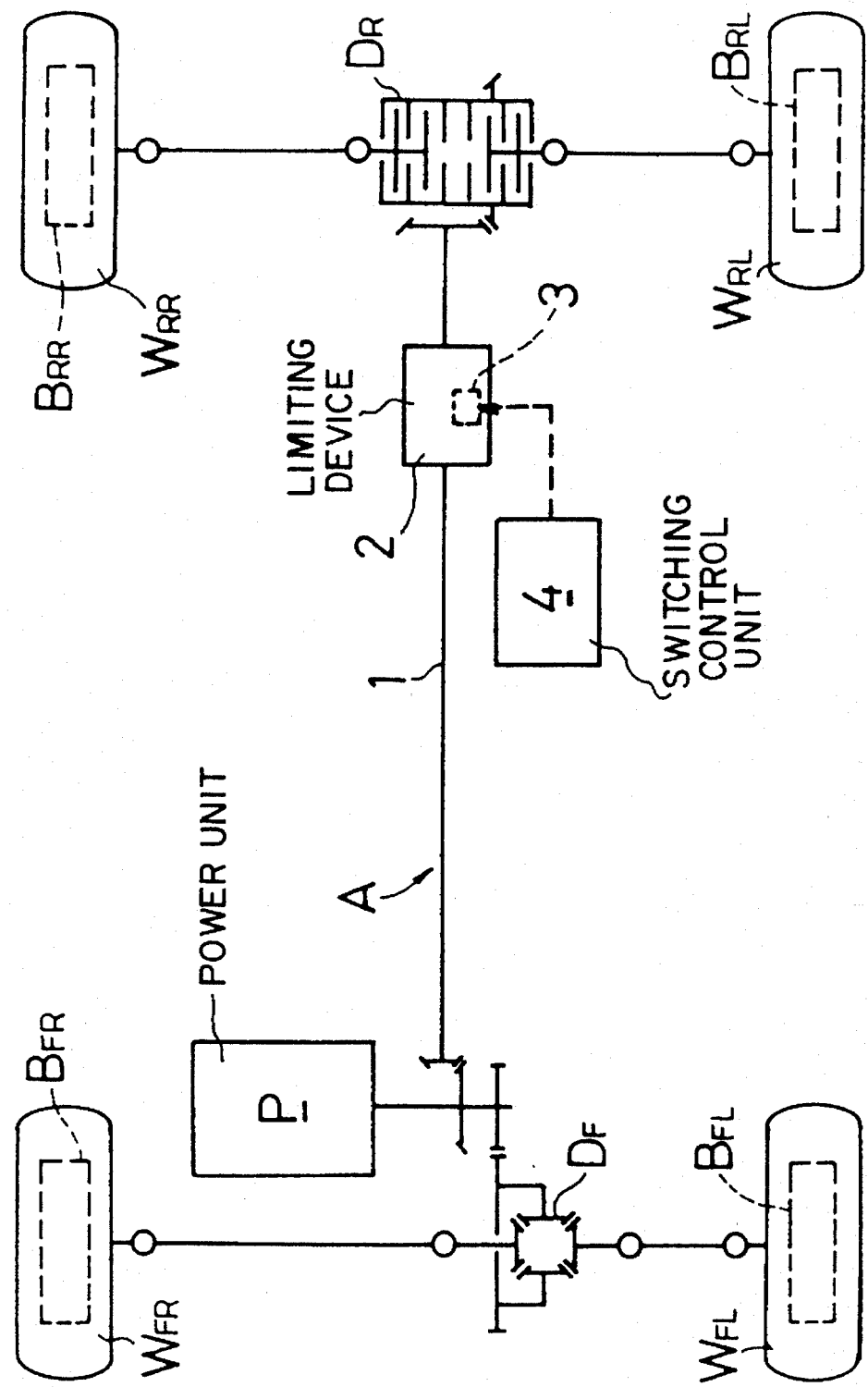
FIG. 1 is a schematic illustration of a drive system in a vehicle.

Referring first to FIG. 1, a pair of front wheels $W_{FL}$ and $W_{FR}$ and a pair of rear wheels $W_{RL}$ and $W_{RR}$ are located at a front portion and a rear portion of a vehicle body which is not shown. The front wheels $W_{FL}$ and $W_{FR}$ and the rear wheels $W_{RL}$ and $W_{RR}$ are connected to a power unit P through a drive system A. The drive system A includes a front differential $D_F$ which connects the front wheels $W_{FL}$ and $W_{FR}$ and the power unit P, a rear differential $D_R$ which connects the rear wheels $W_{RL}$ and $W_{RR}$, and a drive shaft 1 which connects the power unit P and the rear differential $D_R$. A variable differential-operation limiting device 2 is incorporated in an intermediate portion of the drive shaft 1 and is switchable between a two-wheel drive state in which the front wheels $W_{FL}$ and $W_{FR}$ and the rear wheels $W_{RL}$ and $W_{RR}$ are disconnected from each other, so that only the front wheels $W_{FL}$ and $W_{FR}$ function as driving wheels, and a four-wheel drive state in which all the wheels $W_{FL}$, $W_{FR}$, $W_{RL}$ and $W_{RR}$ function as driving wheels, such that the distribution of a driving torque of the front wheels $W_{FL}$ and $W_{FR}$ and a driving torque of the rear wheels $W_{RL}$ and $W_{RR}$ can be varied. An actuator 3 for actuating the variable differential-operation limiting device 2, is controlled by a drive-state switching control unit 4.

Figure 2:
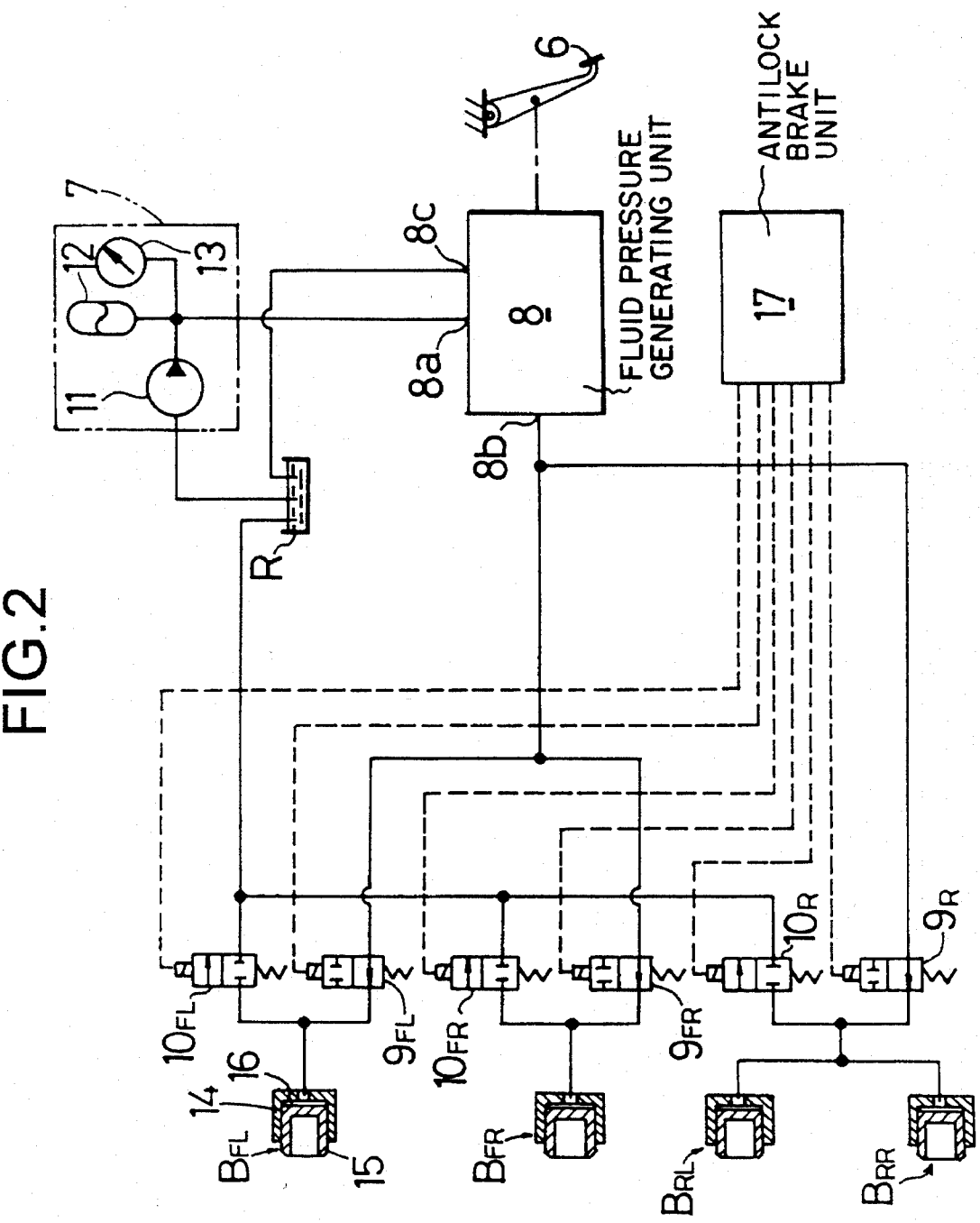
FIG. 2 is a schematic illustration of a brake fluid pressure system in the vehicle.

Referring to FIG. 2, wheel brakes $B_{FL}$, $B_{FR}$, $B_{RL}$ and $B_{RR}$ are mounted on the front wheels $W_{FL}$ and $W_{FR}$ and the rear wheels $W_{RL}$ and $W_{RR}$, respectively. A braking fluid pressure generating means 8 is connected to the wheel brakes $B_{FL}$, $B_{FR}$, $B_{RL}$ and $B_{RR}$ for adjusting the fluid pressure from a fluid pressure source 7 in accordance with the amount of depression of brake pedal 6. During a normal braking operation, an output fluid pressure from the braking fluid pressure generating means 8 is applied to each of the brake devices $B_{FL}$, $B_{FR}$, $B_{RL}$ and $B_{RR}$. The braking fluid pressure for the wheel brakes $B_{FL}$, $B_{FR}$, $B_{RL}$ and $B_{RR}$ can be maintained, reduced or increased by inlet solenoid valves $9_{FL}$ and $9_{FR}$ and outlet solenoid valves $10_{FL}$ and $10_{FR}$ provided in independent correspondence to the wheel brakes $B_{FL}$ and $B_{FR}$ for the front wheels $W_{FL}$ and $W_{FR}$ and an inlet solenoid valve $9_R$ and an outlet solenoid valve $10_R$ provided commonly to the wheel brakes $B_{RL}$ and $B_{RR}$ for the rear wheels $W_{RL}$ and $W_{RR}$, thereby performing an antilock brake control (which will be referred to as an ABS control hereinafter).

The fluid pressure source 7 includes a fluid pressure pump 11 for pumping a working fluid from a reservoir R, an accumulator 12 connected to the fluid pressure pump 11, and a pressure switch 13 for controlling the operation of the fluid pressure pump 11.

The braking fluid pressure generating means 8 includes an input port 8a leading to the fluid pressure source 7, an output port 8b, and a release port 8c leading to the reservoir R. The braking fluid pressure generating means 8 is arranged to output a fluid pressure corresponding to the amount the brake pedal 6 is depressed, from the output port 8b by switching the communication between the output port 8b and the input port 8a and the communication between the output port 8b and the release port 8c from one to the other in response to the depression of the brake pedal 6.

Each of the wheel brakes $B_{FL}$, $B_{FR}$, $B_{RL}$ and $B_{RR}$ includes a cylinder 14 and a braking piston 15 slidably received in the cylinder 14, and is arranged to exhibit a braking force by movement of the braking piston 15 corresponding to the fluid pressure applied to a braking fluid pressure chamber 16 which is defined between the cylinder 14 and the braking piston 15.

The inlet solenoid valves $9_{FL}$ and $9_{FR}$ and the outlet solenoid valves $10_{FL}$ and $10_{FR}$ are connected in parallel to the braking fluid pressure chambers 16 in the wheel brakes $B_{FL}$ and $B_{FR}$ for the front wheels $W_{FL}$ and $W_{FR}$, and the inlet solenoid valve $9_R$ and the outlet solenoid valve $10_R$ are connected in parallel to the braking fluid pressure chambers 16 in the wheel brakes $B_{RL}$ and $B_{RR}$ for the rear wheels $W_{RL}$ and $W_{RR}$. Each of the inlet solenoid valves $9_{FL}$, $9_{FR}$ and $9_R$ is a normally-opened type solenoid valve which is closed upon energization. Each of the outlet solenoid valves $10_{FL}$, $10_{FR}$ and $10_R$ is a normally-closed type solenoid valve which is opened upon energization. The inlet solenoid valves $9_{FL}$ and $9_{FR}$ are interposed between the braking fluid pressure chambers 16 in the wheel brakes $B_{FL}$ and $B_{FR}$ and the output port 8b in the braking fluid pressure generating means 8, respectively. The outlet solenoid valves $10_{FL}$ and $10_{FR}$ are interposed between the braking fluid pressure chambers 16 in the wheel brakes $B_{FL}$ and $B_{FR}$ and the reservoir R, respectively. The inlet solenoid valve $9_R$ is interposed between the braking fluid pressure chambers 16 in the wheel brakes $B_{RL}$ and $B_{RR}$ and the output port 8b in the braking fluid pressure generating means 8. The outlet solenoid valve $10_R$ is interposed between the braking fluid pressure chambers 16 in the wheel brakes $B_{RL}$ and $B_{RR}$ and the reservoir R.

The energization and deenergization of each of the solenoid valves $9_{FL}$, $9_{FR}$, $9_R$, $10_{FL}$, $10_{FR}$ and $10_R$ are controlled by an antilock brake control unit 17. The solenoid valves $9_{FL}$, $9_{FR}$, $9_R$, $10_{FL}$, $10_{FR}$ and $10_R$ are normally in their deenergized states. In the ABS control during braking, any of the inlet solenoid valves $9_{FL}$, $9_{FR}$, $9_R$ corresponding to a wheel about to become locked is closed, thereby suppressing an increase in braking force to avoid the locking of the wheel. However, when the wheel is still about to be brought into its locked state, the corresponding outlet solenoid valve $10_{FL}$, $10_{FR}$, $10_R$ is opened to reduce the braking force, thereby avoiding the locking tendency of the wheel.

Figure 3:
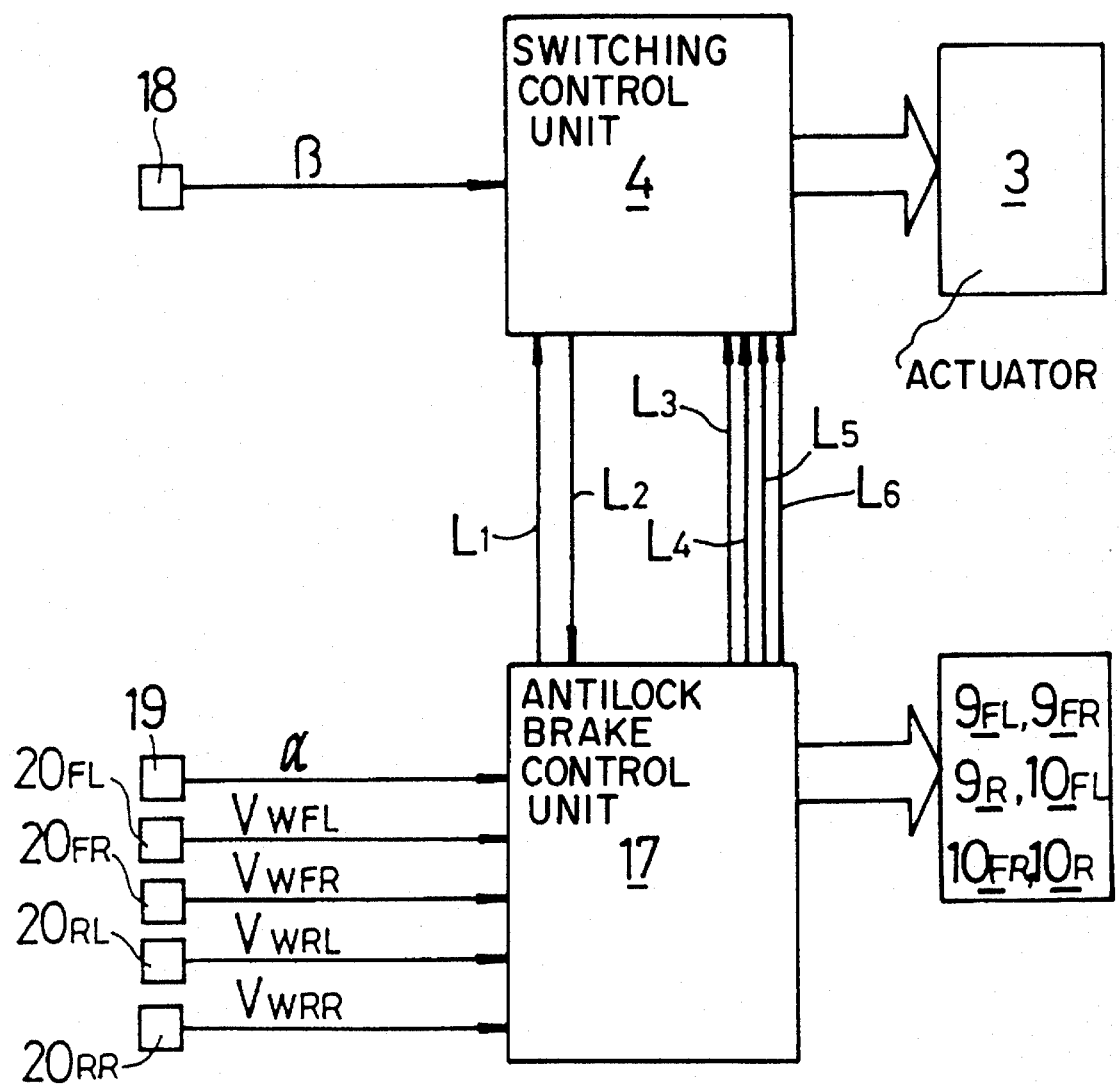
FIG. 3 illustrates the relationship between the control units of the present invention.

Referring to FIG. 3, the drive-state switching control unit 4 controls the operation of the actuator 3, and the antilock brake control unit 17 controls the switching between the energization and deenergization of the inlet solenoid valves $9_{FL}$, $9_{FR}$ and $9_R$ and the outlet solenoid valves $10_{FL}$, $10_{FR}$ and $10_R$. The switching control unit 4 and the antilock brake control unit 17 are both computers. Input signals including a signal from a lateral acceleration sensor 18 for detecting the lateral acceleration β of the vehicle body, is supplied to the drive-state switching control unit 4. Input signals including signals from longitudinal acceleration/deceleration sensor 19 for detecting the longitudinal acceleration/deceleration α of the vehicle, and from wheel speed sensors $20_{FL}$, $20_{FR}$, $20_{RL}$ and $20_{RR}$ for independently detecting wheel speeds $V_{WFL}$, $V_{WFR}$, $V_{WRL}$ and $V_{WRR}$ of the wheels $W_{FL}$, $W_{FR}$, $W_{RL}$ and $W_{RR}$, are supplied to the antilock brake control unit 17.

Signal lines $L_1$ to $L_6$, are provided between the control units 4 and 17. The signal line $L_1$ is for transmitting a signal indicative of a command to switch from the four-wheel drive state to the two-wheel drive state, from control unit 17 to control unit 4. The signal line $L_2$ is for transmitting a signal indicative of completion of the switching from the four-wheel drive state to the two-wheel drive state, from the control unit 4 to the control unit 17. And the four signal lines $L_3$, $L_4$, $L_5$ and $L_6$ are for independently transmitting the wheel speeds $V_{WFL}$, $V_{WFR}$, $V_{WRL}$ and $V_{WRR}$ of the wheels from the antilock brake control unit 17 to the drive-state switching control unit 4.

When a signal indicative of the demand for the switching to the two-wheel drive state is not supplied from the antilock brake control unit 17 through the signal line $L_1$, the drive-state switching control unit 4 provides the four-wheel drive state, while varying the distribution of the driving torque to the front and rear wheels, on the basis of the lateral acceleration $\beta$ detected by the lateral acceleration sensor 18 and the wheel speeds $V_{WFL}$, $V_{WFR}$, $V_{WRL}$, and $V_{WRR}$ supplied from the antilock brake control unit 17 through the signal lines $L_3$, $L_4$, $L_5$ and $L_6$. But when a signal indicative of the demand for the switching to the two-wheel drive state is supplied from the antilock brake control unit 17 through the signal line $L_1$ to the drive-state switching control unit 4, the control unit 4 controls the operation of the actuator 3 to provide the two-wheel drive state in which the front wheels $W_{FL}$ and $W_{FR}$ and the rear wheels $W_{RL}$ and $W_{RR}$ are disconnected from each other, so that only the front wheels $W_{FL}$ and $W_{FR}$ function as the driving wheels.

The antilock brake control unit 17 performs the ABS control by the control of the energization and deenergization of the inlet solenoid valves $9_{FL}$, $9_{FR}$ and $9_R$ and the outlet solenoid valves $10_{FL}$, $10_{FR}$ and $10_R$ corresponding to a wheel about to become locked during braking, and outputs the signal indicative of the command to demand the switching to the two-wheel drive state through the signal line $L_1$ when the ABS control is to be carried out. The antilock brake control unit 17 also outputs a signal indicative of the command to demand the switching to the two-wheel drive state through the signal line $L_1$, when the four wheels are about to gradually become locked, even if the ABS control is not carried out.

Figure 4:
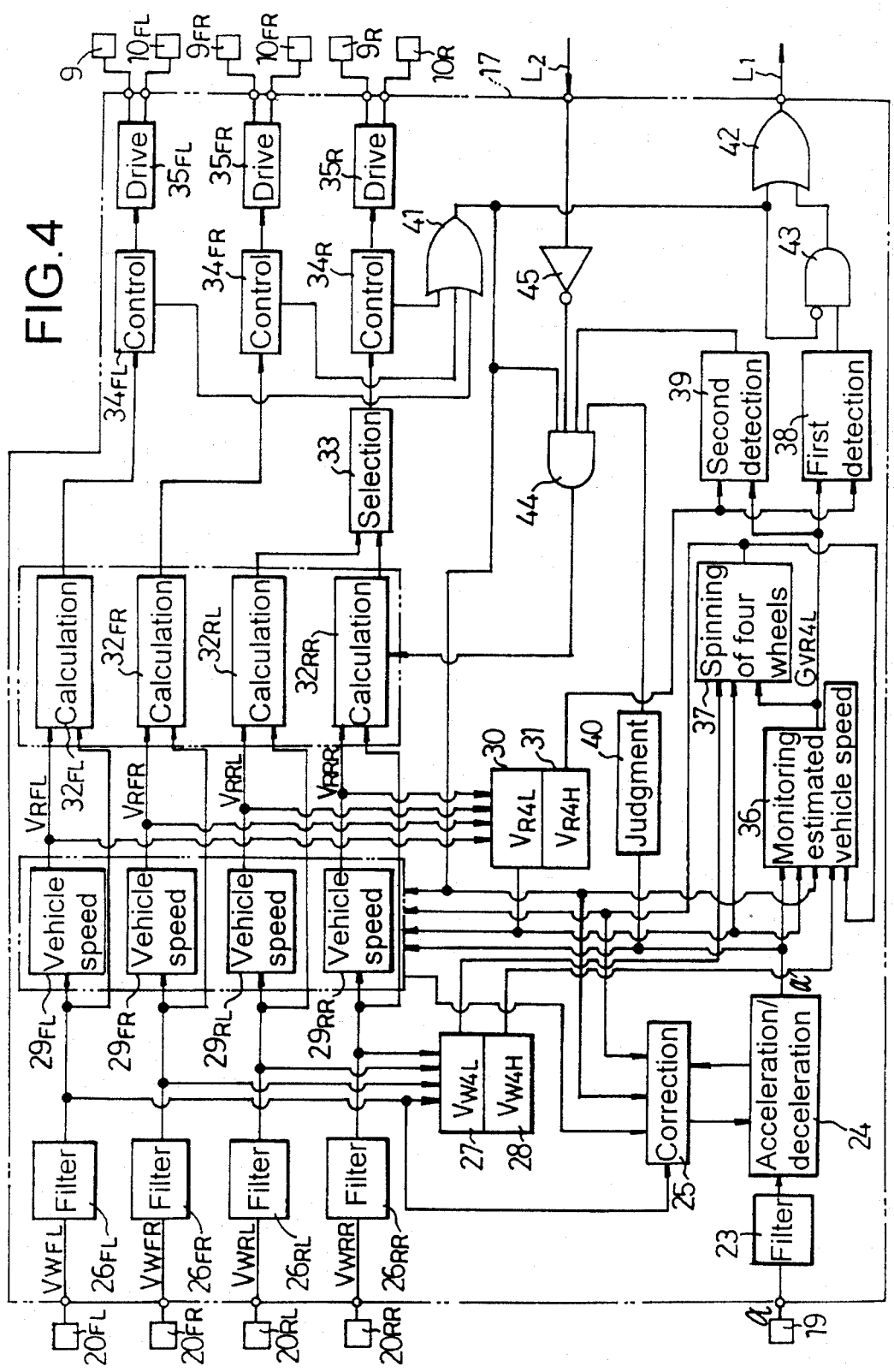
FIG. 4 is a block diagram illustrating the arrangement of an antilock brake control unit.

Referring to FIG. 4, the antilock brake control unit 17 includes: a filter 23 for filtering a detected value detected by the longitudinal acceleration/deceleration sensor 19 which detects the longitudinal acceleration/deceleration $\alpha$ of the vehicle body; an acceleration/deceleration calculating means 24 for adding an offset value to a signal from the filter 23 to provide a longitudinal acceleration/deceleration $\alpha'$; a correcting means 25 for correcting the longitudinal acceleration/deceleration $\alpha'$ determined in the acceleration/deceleration calculating means 24; and filters $26_{FL}$, $26_{FR}$, $26_{RL}$ and $26_{RR}$ for filtering detected values detected by the wheel speed sensors $20_{FL}$, $20_{FR}$, $20_{RL}$ and $20_{RR}$ which detect the wheel speeds $V_{WFL}$, $V_{WFR}$, $V_{WRL}$ and $V_{WRR}$. A low-selection means 27 selects the lowest one of the wheel speeds $V_{WFL}$, $V_{WFR}$, $V_{WRL}$ and $V_{WRR}$ from the filters $26_{FL}$, $26_{FR}$, $26_{RL}$ and $26_{RR}$ as a lowest wheel speed $V_{W4L}$; a high-selection means 28 selects the highest one of the wheel speeds $V_{WFL}$, $V_{WFR}$, $V_{WRL}$ and $V_{WRR}$ as a highest wheel speed $V_{W4H}$; and vehicle speed estimating means $29_{FL}$, $29_{FR}$, $29_{RL}$ and $29_{RR}$ provide estimated vehicle speeds $V_{RFL}$, $V_{RFR}$, $V_{RRL}$ and $V_{RRR}$ on the basis of the wheel speeds $V_{WFL}$, $V_{WFR}$, $V_{WRL}$ and $V_{WRR}$ and an output from the acceleration/deceleration calculating means 24. The antilock brake control unit 17 further includes: a low-selection means 30 for selecting the lowest one of the estimated vehicle speeds $V_{RFL}$, $V_{RFR}$, $V_{RRL}$ and $V_{RRR}$ as a lowest estimated vehicle speed $V_{R4L}$; and a high-selection means 31 for selecting the highest one of the estimated vehicle speeds $V_{RFL}$, $V_{RFR}$, $V_{RRL}$ and $V_{RRR}$ as a highest estimated vehicle speed $V_{R4H}$. Calculating means $32_{FL}$, $32_{FR}$, $32_{RL}$ and $32_{RR}$ independently calculate locking tendencies of the wheels $W_{FL}$, $W_{FR}$, $W_{RL}$ and $W_{RR}$ during braking according to predetermined calculation expressions, respectively; a selection means 33 selects the largest of the locking tendencies calculated in the calculation means $32_{RL}$ and $32_{RR}$ corresponding to the rear wheels $W_{RL}$ and $W_{RR}$; control calculation means $34_{FL}$ and $34_{FR}$ calculate control quantities on the basis of results of calculation in the calculation means $32_{FL}$ and $32_{FR}$ corresponding to the front wheels $W_{FL}$ and $W_{RR}$, respectively and outputs a high level signal during execution of an ABS control; and a control calculation means $34_R$ calculates a control quantity on the basis of a calculation result outputted from the selection means 33, and outputs a high level signal during execution of the ABS control. Drive means $35_{FL}$, $35_{FR}$ and $35_R$ drive the inlet solenoid valves $9_{FL}$, $9_{FR}$ and $9_R$ and the outlet solenoid valves $10_{FL}$, $10_{FR}$ and $10_R$ in accordance with the control quantities outputted from the control calculation means $34_{FL}$, $34_{FR}$ and $34_R$. A monitored estimated vehicle speed calculating means 36 calculates a monitored estimated vehicle speed $G_{VR4L}$ on the basis of the highest wheel speed $V_{W4H}$ and the longitudinal acceleration/deceleration $\alpha'$. A 4-wheel spin detecting means 37 detects whether all the wheels $W_{FL}$, $W_{FR}$, $W_{RL}$ and $W_{RR}$ are in a spinning state; a first detection means 38 detects the fact that the four wheels are about to gradually fall into locked states when the braking operation force is small in the four-wheel drive condition; a second detection means 39 detects the fact that the four wheels are about to gradually fall into locked states for any reason when the ABS control is carried out and the four-wheel drive condition is maintained; and a judging means 40 judges whether the longitudinal acceleration/deceleration $\alpha'$ is in a predetermined range. The antilock brake control unit also includes OR gates 41 and 42; AND gates 43 and 44; and an inverter 45.

The output from the longitudinal acceleration/deceleration sensor 19 for detecting the longitudinal acceleration/deceleration $\alpha$ has an output error which includes an output dispersion component due to causes such as midpoint displacement, rectilinearity, hysteresis, a temperature characteristic and a mounting error; and a slope component provided when the vehicle travels on a slope. The output error is of a relatively large value represented by $(a_1+b_1)$ wherein $a_1$ represents the output dispersion component and $b_1$ represents the slope component. In the acceleration/deceleration calculating means 24, an offset value $S_0$ corresponding to the output error is added to the longitudinal acceleration/deceleration $\alpha$ provided in the longitudinal acceleration/deceleration sensor 19 to give a longitudinal acceleration/deceleration $\alpha'$. However, because the output error is relatively large $(a_1+b_1)$ as described above, the offset value $S_0$ must also be set at a large value as a sum $(S_{01}+S_{02})$ of an offset value $S_{01}$ corresponding to the output dispersion component and an offset value $S_{02}$ corresponding to the slope component. Therefore, if control is conducted by using a longitudinal acceleration/deceleration $\alpha'$ resulting from the addition of such a large offset value $S_0$, the accuracy of the control can not be excellent.

Therefore, when it is possible to decide that the vehicle is traveling at a substantially constant speed for a relatively long period of time, e.g., for 30 seconds, the correcting means 25 calculates a first correction amount $C_1$ which eliminates the effect of traveling on the slope. When it is possible to decide that the vehicle is traveling at a substantially constant speed for a relatively short period of time, e.g., for 500 m sec., the correcting means 25 calculates a second correction amount $C_2$ which follows a change in the slope, corrects the zero point of the longitudinal acceleration/deceleration sensor 19 by the first correction amount $C_1$, and corrects the offset value $S_0$ by the second correction amount $C_2$, so that the offset value $S_0$ used in the calculation in the acceleration/deceleration calculating means 24 is reduced as much as possible.

The calculation of the first and second correction amount $C_1$ and $C_2$ in the correcting means 25 is carried out, only upon occurrence of the following four conditions:

The first condition is that none of the wheels $W_{FL}$, $W_{FR}$, $W_{RL}$ and $W_{RR}$ is in a spinning state. Therefore, a signal indicative of a result of detection in the four-wheel spin detecting means 37 and a signal indicative of results of spin detection in the vehicle speed estimating means $29_{FL}$, $29_{FR}$, $29_{RL}$ and $29_{RR}$ are supplied to the correcting means 25, as shown in FIG. 4.

The second condition is that none of the wheel brakes $B_{FL}$, $B_{FR}$, $B_{RL}$ and $B_{RR}$ is in an ABS controlled state. Therefore, the output terminal of the OR gate 41 is connected to the correcting means 25, as shown in FIG. 4. The output terminal of the OR gate 41 outputs a high level signal when at least one of the wheel brakes $B_{FL}$, $B_{FR}$, $B_{RL}$ and $B_{RR}$ is in the ABS controlled state.

The third condition is that it is possible to decide that the vehicle is traveling at a constant speed, e.g., 50 km/hr or greater. When none of the wheels $W_{FL}$, $W_{FR}$, $W_{RL}$ and $W_{RR}$ are in a spinning state and none of the wheel brakes $B_{FL}$, $B_{FR}$, $B_{RL}$ and $B_{RR}$ are in an ABS controlled state, the vehicle speed can be represented by the wheel speed. For example, the wheel speed $V_{WFL}$ detected by the wheel speed sensor $20_{FL}$ is filtered in the filter $26_{FL}$ and then supplied to the correcting means 25, as shown in FIG. 4. Since $V_{WFL}$ is equal to or greater than 50 km/hr, it is decided that the vehicle speed is also equal to or greater than 50 km/hr.

The fourth condition is that the output from the longitudinal acceleration/deceleration sensor 19 is stable. It is decided that the output from the longitudinal acceleration/deceleration sensor 19 is stable, when following inequalities (1) to (3) are established:

$$-r_1 \leq \Delta V_W \leq +r_1 \quad (1)$$

$$-r_2 \leq VG \leq +r_2 \quad (2)$$

$$\alpha_{INT}-r_3 \leq \alpha \leq \alpha_{INT}+r_3 \quad (3)$$

wherein $\Delta V_W$ represents an amount of variation in the wheel speed $V_{WFL}$ in every calculating loop; VG represents an amount of variation in the wheel speed $V_{WFL}$ in every 500 sec.; and $\alpha_{INT}$ represents an output from the longitudinal acceleration/deceleration sensor 19 at the start of calculation.

The above expression (1) represents a condition that the vehicle is not in an accelerated or decelerated state; expression (2) represents that the vehicle is not in a bad road traveling state, and expression (3) represents a condition that the slope is not varied.

Figure 5:
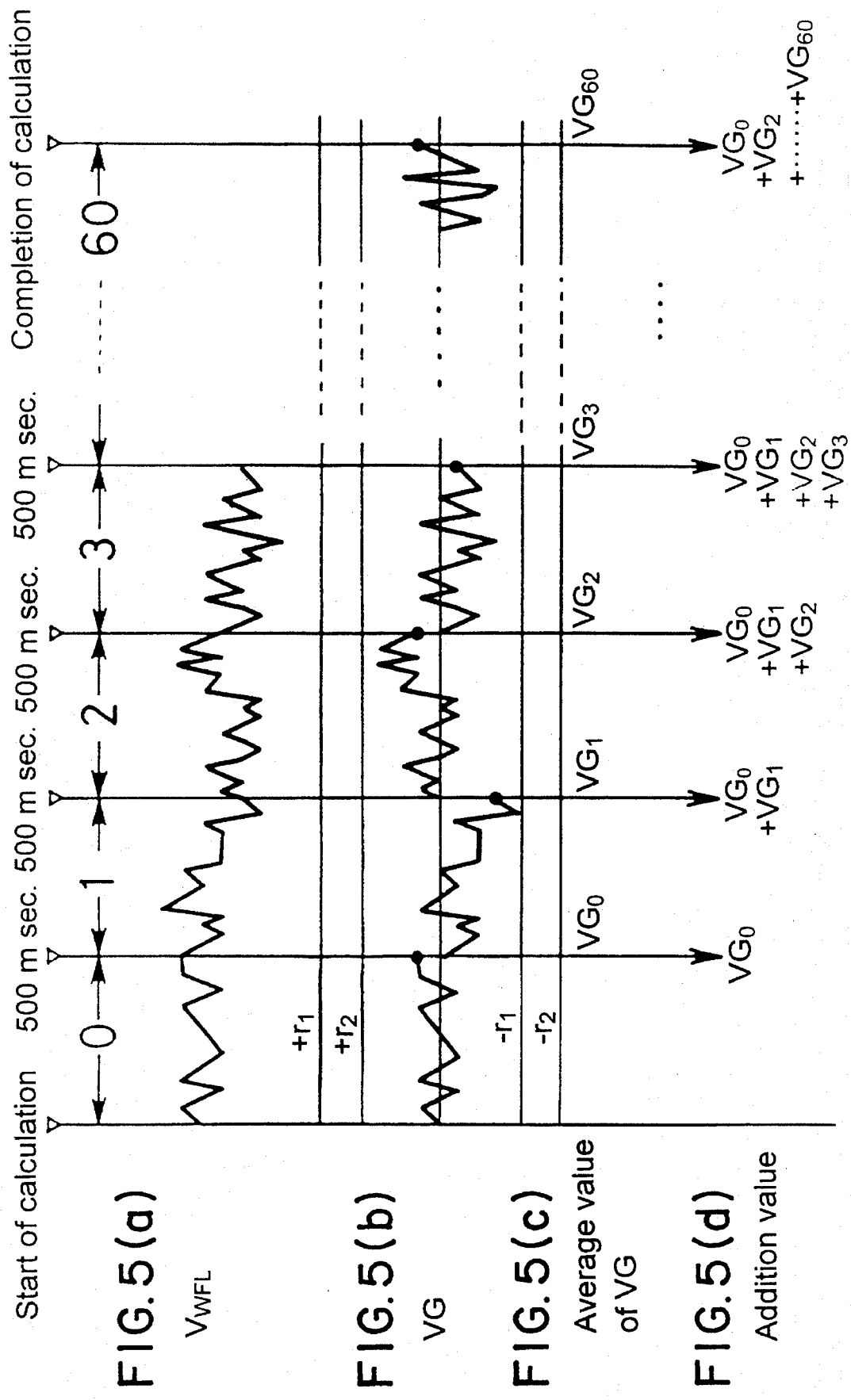
FIG. 5(a)–5(d) are a diagram illustrating the steps of calculation of average values of the variations in wheel speeds in a correcting means.

When the first to fourth conditions have been established, if the wheel speed $V_{WFL}$ is varied as shown in FIG. 5(a) and the amounts VG of variation in the wheel speed $V_{WFL}$ at every 500 m sec. are as shown in FIG. 5(b), variation amounts $VG_0$, $VG_1$, $VG_2$, $VG_3$ ... $VG_{60}$ are calculated 60 times at every 500 m sec, i.e., for 30 seconds, as shown in FIG. 5(c) and the sum of these amounts are calculated at every 500 m sec, as shown in FIG. 5(d).

As a result, when 30 seconds have elapsed, an average value $VG_{AV}$ of amounts of variation in the wheel speed $V_{WFL}$ for 30 seconds is determined according to a following expression (4):

$$VG_{AV}=(VG_0+VG_1+VG_2+VG_3 \ldots +VG_{60})/60 \quad (4)$$

Figure 6:
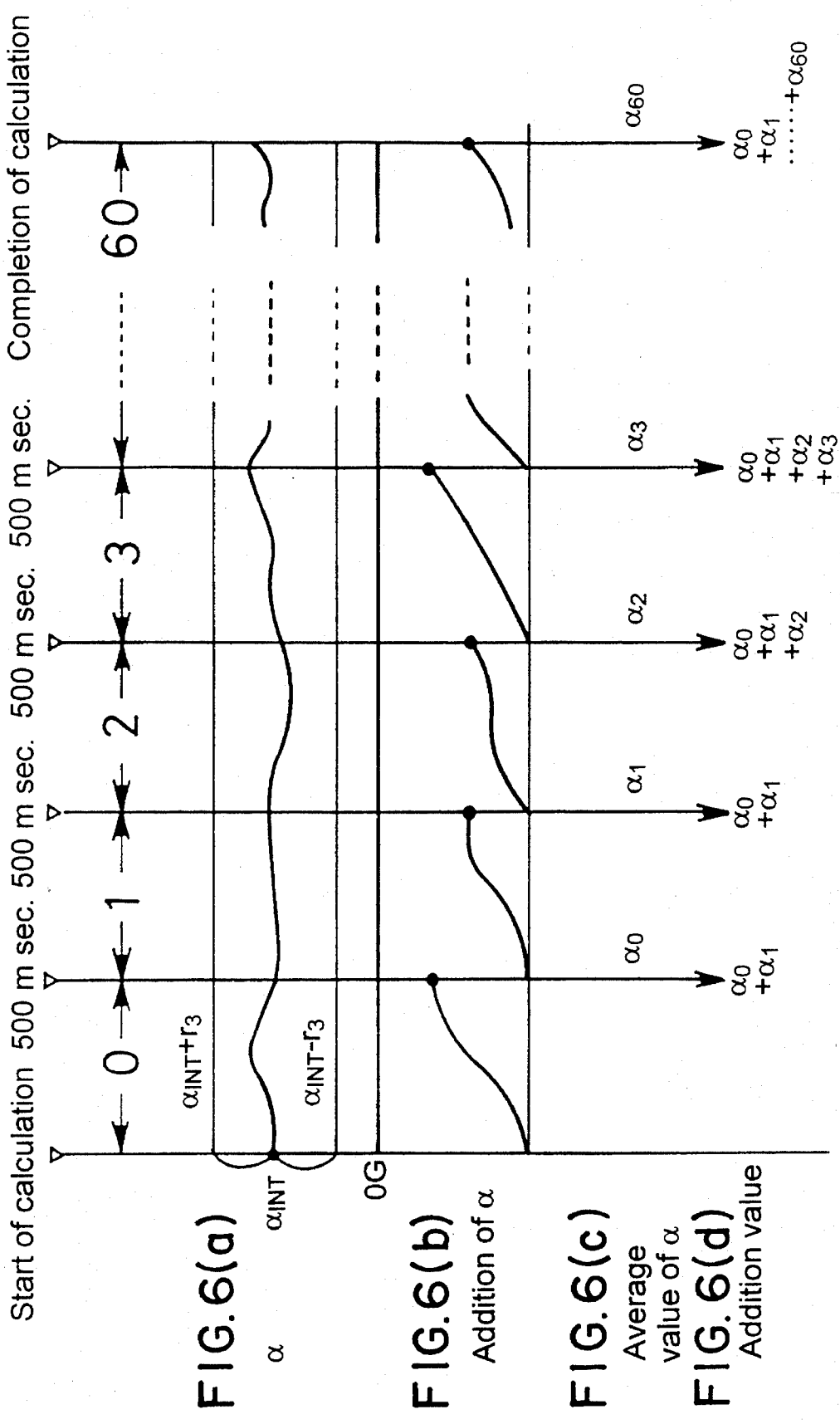
FIG. 6(a)–6(d) is a diagram illustrating the steps of calculation of an average value of the longitudinal acceleration or deceleration in a correcting means.

When the output $\alpha$ from the longitudinal acceleration/deceleration sensor 19 is varied as shown in FIG. 6(a), and the values of addition of the outputs $\alpha$ at every 500 m sec are as shown in FIG. 6(b), average values $\alpha_0$, $\alpha_1$, $\alpha_2$, $\alpha_3$ ... $\alpha_{60}$ of the outputs $\alpha$ are calculated 60 times at 500 m sec intervals, i.e., for 30 seconds as shown in FIG. 6(c), and the value of the sum of the average values is calculated every 500 m sec, as shown in FIG. 6(d).

As a result, when 30 seconds have elapsed, an average value $\alpha_{AV}$ of the outputs $\alpha$ from the longitudinal acceleration/deceleration sensor 19 is determined according to a following expression (5):

$$\alpha_{AV}=(\alpha_0+\alpha_1+\alpha_2+\alpha_3 \ldots \alpha_{60})/60 \quad (5)$$

The first correction amount $C_1$ is determined as a deviation of the average value of the output from the longitudinal acceleration/deceleration sensor 19 with respect to the average value $VG_{AV}$ of the variation in the wheel speed $V_{WFL}$ for a long period of time, for example, 30 seconds in a condition in which it is possible to decide that the vehicle is traveling at a substantially constant speed for such a long period of time. The first correction amount $C_1$ is determined according to a following expression:

$$C_1=\alpha_{AV}-VG_{AV} \quad (6)$$

Therefore, the first correction amount $C_1$ is provided by incorporating the values determined in the expressions (4) and (5) into the expression (6).

The second correction amount $C_2$ is determined as deviations of the average values $\alpha_0$, $\alpha_1$, $\alpha_2$, $\alpha_3$ ... $\alpha_{60}$ of the outputs from the longitudinal acceleration/deceleration sensor 19 with respect to the average values $VG_0$, $VG_1$, $VG_2$, $VG_3$ ... $VG_{60}$ of the amounts of variation in the wheel speed $V_{WFL}$ for a relatively short period of time, for example, 500 m sec in a condition in which it is possible to decide that the vehicle is traveling at a substantially constant speed for such short period of time. Thus, the second correction amount $C_2$ is calculated as $(C_{20}=\alpha_0-GV_0)$, $(C_{21}=\alpha_1-GV_1)$, $(C_{22}=\alpha_2-GV_2)$, $(C_{23}=\alpha_3-GV_3)$, ... $(C_{260}=\alpha_{60}-GV_{60})$, every 500 m sec.

Figure 7:
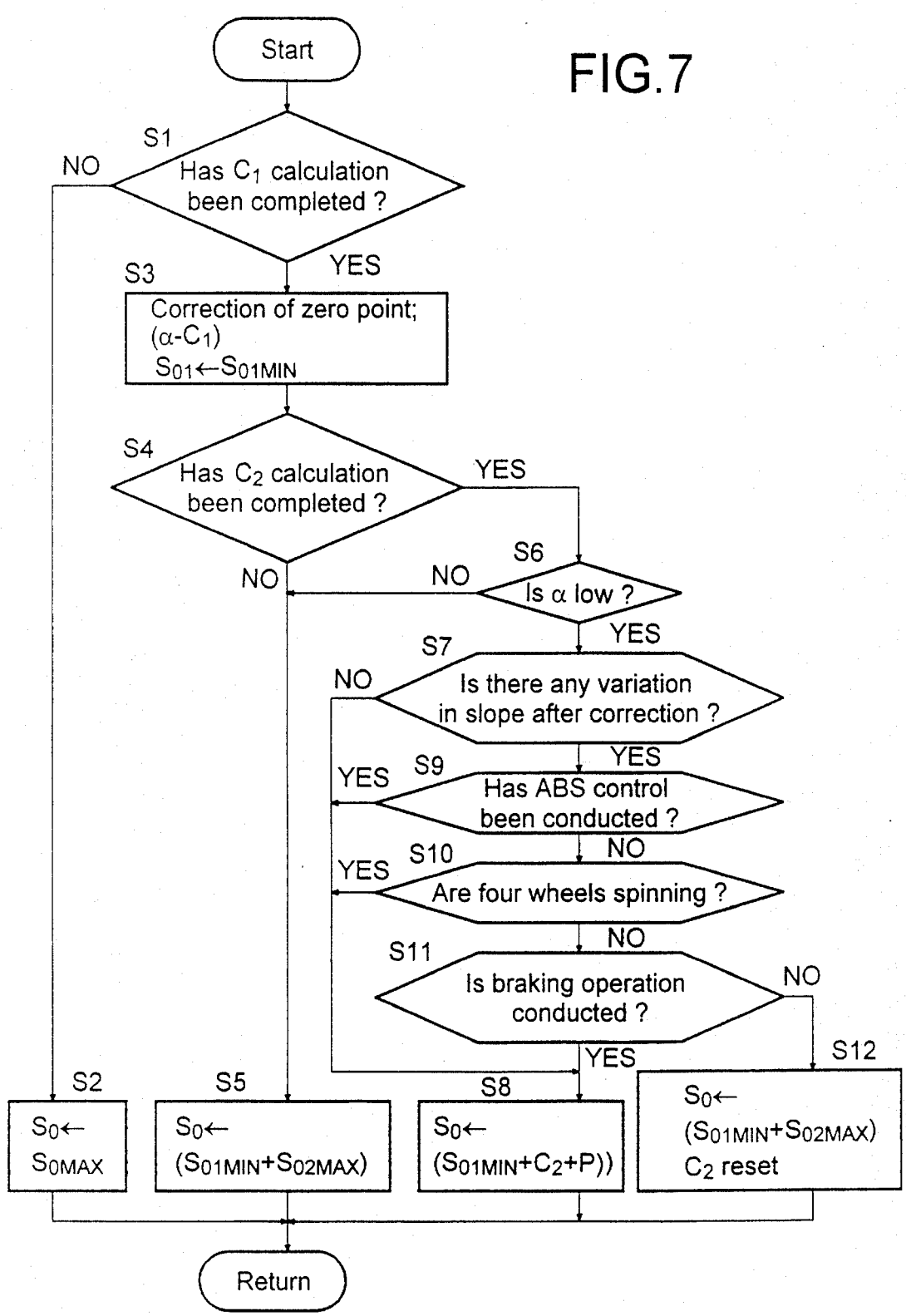
FIG. 7 is a flow chart illustrating a method for correcting the detection value detected by the longitudinal acceleration/deceleration sensor.

After completion of the calculation of the first and second correction amounts $C_1$ and $C_2$, the correction of the zero point of the longitudinal acceleration/deceleration sensor 19 and the correction of the offset value $S_0$ are carried out by a procedure shown in FIG. 7.

Referring to FIG. 7, at Step S1, it is determined whether the calculation of the first correction amount $C_1$ has been completed. If NO, the offset value $S_0$ is not changed and is set at a maximum value $S_{0MAX}$ at Step S2.

If it is decided at Step S1 that the calculation of the first correction amount $C_1$ has been completed, the first correction amount $C_1$ is subtracted from the output $\alpha$ of the longitudinal acceleration/deceleration sensor 19 to perform the correction of the zero point of the longitudinal acceleration/deceleration sensor 19, and the output dispersion component $S_{01}$ of the offset value $S_0$ is set at the minimum value $S_{01MIN}$, at Step S3.

At Step S4 following Step S3, it is determined whether the calculation of the second correction amount $C_2$ has been completed. If it is decided that the calculation is not completed, the offset value $S_{01}$ corresponding to the output dispersion component is set at the minimum value $S_{01MIN}$ and the offset value $S_{02}$ corresponding to the slope output component is set at the maximum value $S_{02MAX}$ at Step S5, on the basis of the fact that the correcting calculation of the slope component is not completed. The total offset value $S_0$ is determined as $(S_{01MIN}+S_{02MAX})$ If it is decided at Step S4 that the calculation of the second correction amount $C_2$ has been completed, it is determined at Step S6 whether the output α from the longitudinal acceleration/deceleration sensor 19 is low. This determination is performed for the purpose of changing the offset value $S_0$ only on a road surface with a low friction coefficient. If NO at Step S6, the processing is advanced to Step S5. If YES at Step S6, the processing is advanced to Step S7.

When the slope is varied, the second correction value $C_2$ provided up to that time is inappropriate because the correction by the second correction value $C_2$ is intended for the slope component. Therefore, it is determined at Step S7 whether there is a variation in slope, in accordance with whether the deviation between the amount VG of the variation in the wheel speed and a value resulting from addition of the second value $C_2$ to the output α from the longitudinal acceleration/deceleration sensor 19 is equal to or greater than a given value P or not. If it is decided that there is no variation in slope, the processing is advanced to Step S8. If it is decided that there is a variation in slope, the processing is advanced to Step S9.

At Step S8, the minimum offset value $S_{01MIN}$ corresponding to the output dispersion component, the second correction amount $C_2$ corresponding to the slope output component and the given value P are added together to provide a total offset value $S_0$. The addition of the given value P is based on the determination of whether there is a variation in slope at Step S7 on the basis of whether the deviation between the amount VG of variation in the wheel speed and the value resulting from addition of the second value $C_2$ to the output α from the longitudinal acceleration/deceleration sensor 19 is equal to or greater than the given value P. Therefore, a component depending upon the variation in slope corresponding to the given value P is included in the offset value $S_0$.

It is determined at Step S9 whether the ABS control is being carried out even for one wheel. It is determined at Step S10 whether the four wheels are spinning, and it is determined at Step S11 whether the braking operation is being carried out. Even when it is decided at Step S7 that there is a variation in slope, the offset value $S_0$ is changed at Step S8 if the ABS control is carried out. Even when the ABS control is not being carried out, if the four wheels are spinning, the offset value So is changed at Step S8. Further, even when the four wheels are not spinning, if the braking operation is carried out, the offset value $S_0$ is changed at Step S8. Moreover, in a condition in which it has been decided that there is a variation in slope, when the ABS control is not being carried out and the four wheels are not spinning, and further, the braking operation is not carried out, the offset value $S_0$ is set as a sum of the minimum offset value $S_{01MIN}$ corresponding to the output dispersion component and the maximum offset value $S_{02MAX}$ corresponding to the slope output component, and at the same time, the second correction value $C_2$ is reset, at Step S12 in a similar manner to Step S5.

In this manner, in the condition when it is determined that the vehicle is traveling at a substantially constant speed for a relatively long period of time (30 seconds), the effect of traveling on a slope is eliminated to calculate the first correction amount $C_1$. When it is determined that the vehicle is traveling at a substantially constant speed for a relatively short period of time (500 m sec), the second correction amount $C_2$ following the variation in slope is calculated. The zero point of the longitudinal acceleration/deceleration sensor 19 is corrected by the first correction amount $C_1$, and the offset value $S_0$ is corrected by the second correction amount $C_2$, whereby the offset value $S_0$ in the longitudinal acceleration/deceleration α' outputted from the acceleration/deceleration calculating means 24 is set at a small value.

Referring again to FIG. 4, the four-wheel spin detecting means 37 detects the spinning of the four wheels, on the basis of: the output from the low-selection means 27 for selecting the lowest one of the wheel speeds $V_{WFL}$, $V_{WFR}$, $V_{WRL}$ and $V_{WRR}$ as the lowest wheel speed $V_{W4L}$; the output from the low-selection means 30 for selecting the lowest one of the estimated vehicle speeds $V_{RFL}$, $V_{RFR}$, $V_{RRL}$ and $V_{RRR}$ as the lowest vehicle speed $V_{R4L}$; and the monitored estimated vehicle speed $G_{VR4L}$ determined in the monitored estimated vehicle speed calculating means 36. The monitored estimated vehicle speed $G_{VR4L}$ will be described in detail in the description of the monitored estimated vehicle speed calculating means 36 described hereinafter, but is determined basically on the basis of the highest wheel speed $V_{W4H}$ provided in the high-selection means 28 and the longitudinal acceleration/deceleration α' determined in the acceleration/deceleration calculating means 24.

In the four-wheel spin detecting means 37, when a condition in which the lowest wheel speed $V_{W4L}$ is higher than the lowest estimated vehicle speed $V_{R4L}$, for example, by 2 km/hr or more ($V_{W4L}-V_{R4L} \geq 2$ km/hr), has been continued, for example, for 500 m sec, it is determined that the four wheels are in their spinning states, and a flag WSF is set. In addition, when the lowest wheel speed $V_{W4L}$ is equal to or lower than the monitored estimated vehicle speed $G_{VR4L}$ ($V_{W4L} \leq G_{VR4L}$), or when a given time period, e.g., 10 seconds has elapsed from the time when the flag WSF is set, it is determined that the spinning of the four wheels has stopped, and the flag WSF is reset while the flag WSEF is set. Moreover, at the time of setting the flag WSEF, the determination of the spinning of the four wheels is prohibited, and the processing of (the monitored estimated vehicle speed $G_{VR4L}$←the lowest estimated vehicle speed $V_{R4L}$) is carried out. When $V_{W4L}$ ($G_{VR4L}$) $V_{R4L}$ is established, the flag WSEF is reset.

Figure 8:
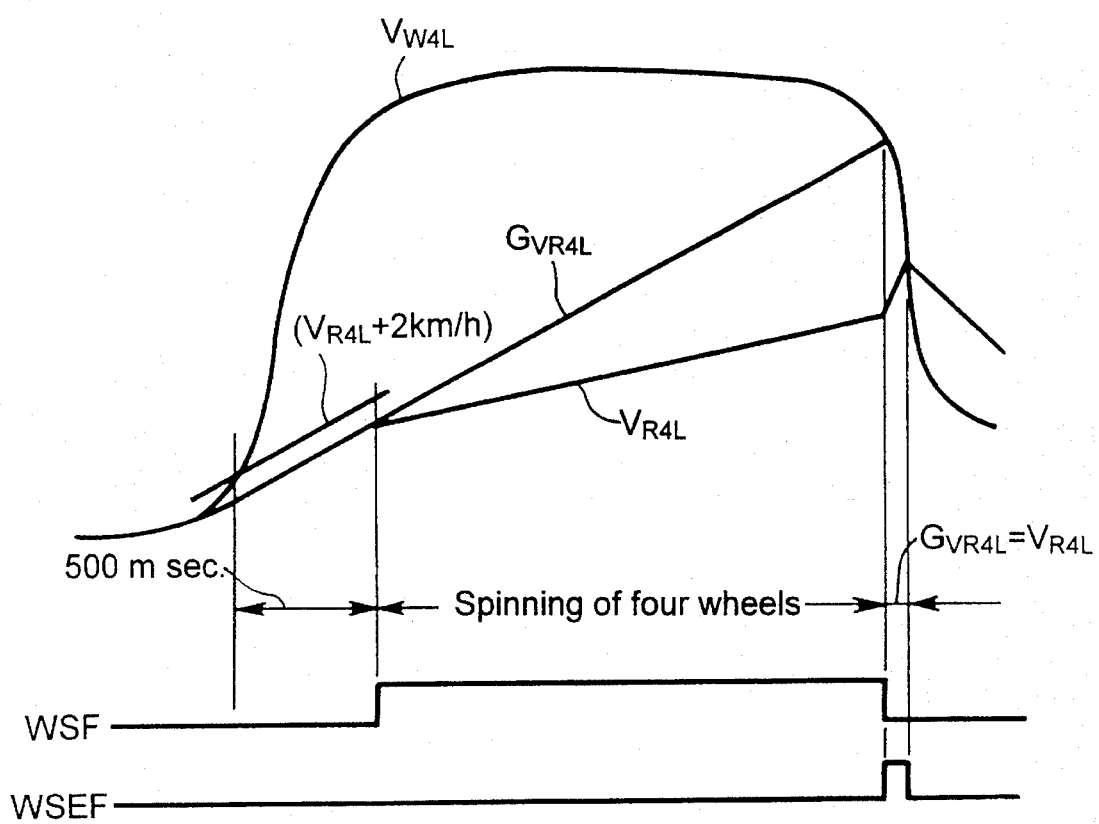
FIG. 8 is a diagram for explaining the detection of the spinning of the four wheels.

When the cessation of the spinning of the four wheels is determined by the monitored estimated vehicle speed $G_{VR4L}$ in four-wheel spin detecting means 37, the relationship among each of the speeds and flags is as shown in FIG. 8. In this case, while the flag WSF is set on the basis of the determination that the four wheels are spinning, the monitored estimated vehicle speed $G_{VR4L}$ is increased by a value corresponding to the output α' from the acceleration/deceleration calculating means 24, whereas the lowest estimated vehicle speed $V_{R4L}$ is increased by a value corresponding to a value resulting from subtraction of the offset value $S_0$ from the output α', i.e., by a detection value α detected by the longitudinal acceleration/deceleration sensor 19. When the flag WSEF has been set, $G_{VR4L}$ is equal to $V_{R4L}$, but the lowest estimated vehicle speed $V_{R4L}$ during this time period is increased regularly by 1.0 G.

Figure 9:
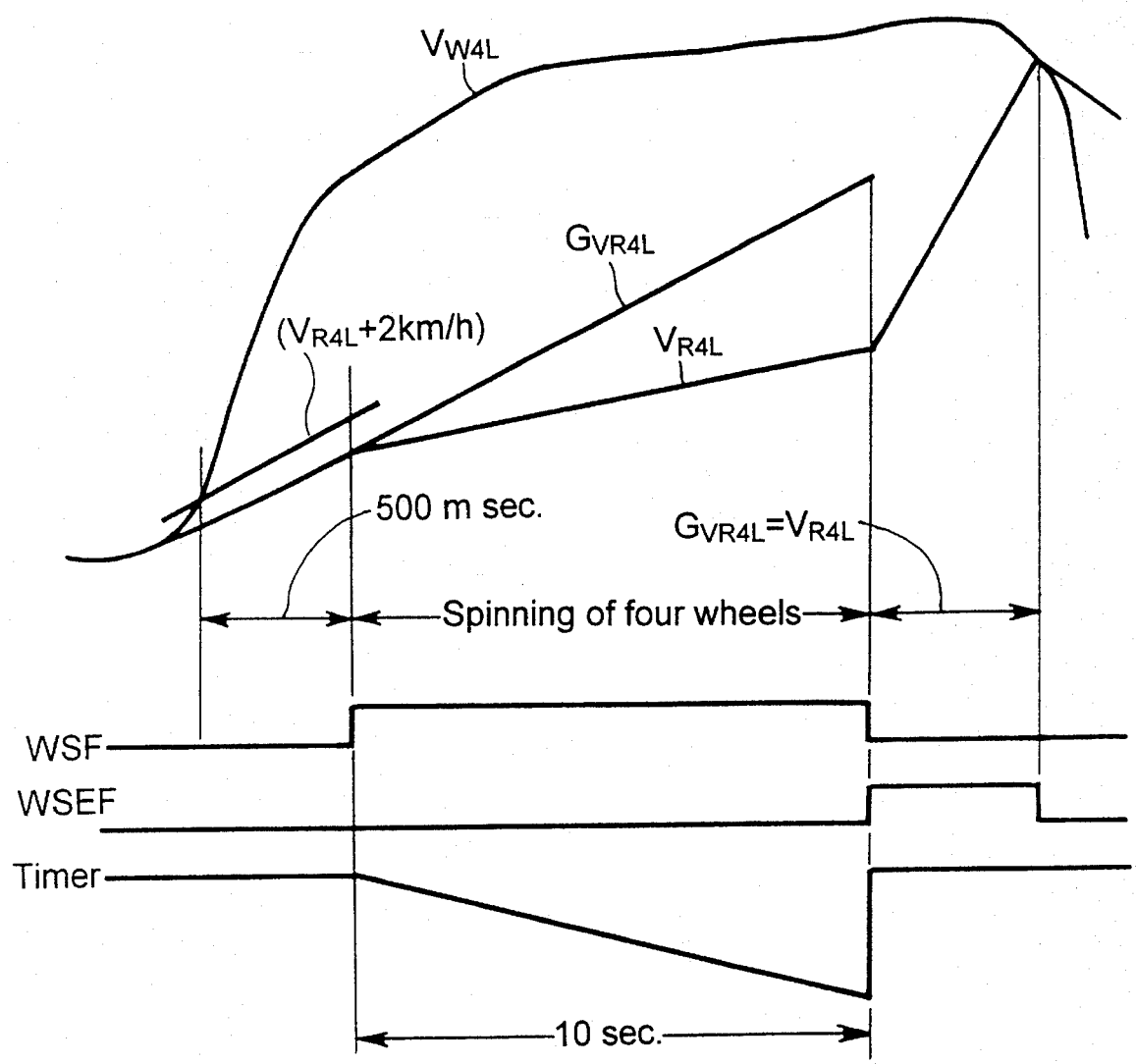
FIG. 9 is a diagram for explaining the detection of spinning of the four wheels, wherein the determination of the stopping of the spinning of the four wheels is different from that in FIG. 8.

When it is decided that the four-wheel spinning state has been completed after the lapse of a given time period, e.g., 10 seconds from the setting of the flag WSF, the relationship among each of the speeds and flags is as shown in FIG. 9. When it is determined that the four wheels are in a spinning state and the flag WSF is set, the lowest estimated vehicle speed $V_{R4L}$ is increased by a value corresponding to a value resulting from subtraction of the offset value $S_0$ of the output $\alpha'$ from the acceleration/deceleration calculating means 24 and thus, the deviation may increase without limitation. Therefore, the time limit is set for the four wheel spinning state so as to prevent the deviation from increasing without limitation.

The monitored estimated vehicle speed calculating means 36 is for obtaining a monitored estimated vehicle speed $G_{VG4L}$ for monitoring the four wheels to determine the spinning of four wheels and to prevent the four wheels from gradually falling into their locked states. Outputs from the acceleration/deceleration calculating means 24, the high-selection means 28, the low-selection means 30, the four-wheel spin detecting means 37 and the OR gate 41 are supplied to the monitored estimated vehicle speed calculating means 36.

The monitored estimated vehicle speed calculating means 36 determines an acceleration or deceleration by the highest wheel speed $V_{W4H}$ obtained by the high-selection means 28, and increases or decreases the longitudinal acceleration/deceleration $\alpha'$ by such acceleration or deceleration, thereby providing a monitored estimated vehicle speed $G_{VR4L}$.

The wheel speeds $V_{WFL}$, $V_{WFR}$, $V_{WRL}$ and $V_{WRR}$ are independently supplied via the filters $26_{FL}$, $26_{FR}$, $26_{RL}$ and $26_{RR}$ to the vehicle speed estimating means $29_{FL}$, $29_{FR}$, $29_{RL}$ and $29_{RR}$, respectively. The outputs from the acceleration/deceleration calculating means 24, the low-selection means 30, the four-wheel spin detecting means 37 and the OR gate 41 are also supplied to the vehicle speed estimating means $29_{FL}$, $29_{FR}$, $29_{RL}$ and $29_{RR}$. The vehicle speed estimating means $29_{FL}$, $29_{FR}$, $29_{RL}$ and $29_{RR}$ independently calculate estimated vehicle speeds $V_{RFL}$, $V_{RFR}$, $V_{RRL}$ and $V_{RRR}$ on the basis of values resulting from addition of the longitudinal acceleration/deceleration $\alpha'$ obtained in the acceleration/deceleration calculating means 24 to the wheel speeds $V_{WFL}$, $V_{WFR}$, $V_{WRL}$ and $V_{WRR}$ obtained in the wheel speed sensors $20_{FL}$, $20_{FR}$, $20_{RL}$ and $20_{RR}$.

The first and second detecting means 38 and 39 detect that the four wheels are about to gradually fall into their locked states on the basis of the monitored estimated vehicle speed $G_{VR4L}$ received from the monitored estimated vehicle speed calculating means 36 and the highest estimated vehicle speed $V_{R4H}$ received from the high-selection means 31 as the highest one of the estimated vehicle speeds $V_{RFL}$, $V_{RFR}$, $V_{RRL}$ and $V_{RRR}$ determined in the vehicle speed estimating means $29_{FL}$, $29_{FR}$, $29_{RL}$ and $29_{RR}$.

In the first and second detecting means 38 and 39, first and second judgement speeds $G_{VR1}$ and $G_{VR2}$ are determined according to following expressions (7) and (8) using the monitored estimated vehicle speed $G_{VR4L}$:

$$G_{VR1} = x_1 \times G_{VR4L} \tag{7}$$

$$G_{VR2} = x_2 \times G_{VR4L} \tag{8}$$

wherein, $1 > x_1 > x_2$.

According to the expressions (7) and (8), the first and second judgement speeds $G_{VR1}$ and $G_{VR2}$ are determined at values lower than the monitored estimated vehicle speed $G_{VR4L}$ estimated on the basis of the detection value detected by the longitudinal acceleration/deceleration sensor 19 and the highest wheel speed $V_{W4H}$ which is the highest one of the wheel speeds $V_{WFL}$, $V_{WFR}$, $V_{WRL}$ and $V_{WRR}$.

When a condition in which the highest estimated vehicle speed $V_{R4H}$ is equal to or lower than the first and second judgement speeds $G_{VR1}$ and $G_{VR2}$ ($V_{R4H} \leq G_{VR1}$, $V_{R4H} \leq G_{VR2}$) has been maintained, for example, for 50 m sec, each of the first and second detecting means 38 and 39 determines that the four wheels are about to become locked, and outputs a high level signal. When a condition in which the above-described condition (i.e., $V_{R4H} \leq G_{VR1}$, $V_{R4H} \leq G_{VR2}$) is restored to a condition of $V_{R4H} \geq G_{VR1}$ and $V_{R4H} \geq G_{VR2}$ has been maintained, for example, for 50 m sec, each of the first and second detecting means 38 and 39 determines that the possibility of locking of the four wheels has been eliminated, and outputs a low level signal.

FIG. 10 shows the operations of the first and second detecting means 38 and 39 with respect to, for example, the left front wheel. When the condition of $V_{R4H} \leq G_{VR1}$ and $V_{R4H} \leq G_{VR2}$ has been continued for 50 m sec, each of the first and second detecting means 38 and 39 outputs the high level signal. If such condition is restored to $V_{R4H} \geq G_{VR1}$ and $V_{R4H} \geq G_{VR2}$ and continued for 50 m sec, the output from each of the first and second detecting means 38 and 39 is changed to a low level.

The output from the first detecting means 38 is inputted to one of input terminals of the AND gate 43. An output from the OR gate 41, which outputs a high level signal when the ABS control is carried out through the determination that any of the four wheels is about to become locked, is inputted in an inverted manner to the other input terminal of the AND gate 43. Therefore, when the ABS control is not carried out and the first detecting means 38 outputs the high level signal, i.e., when the four wheels are about to gradually fall into their locked states in the four-wheel drive condition during non-execution of the ABS control, the AND gate 43 outputs a high level signal, and this output from the AND gate 43 is inputted to one of the input terminals of the OR gate 42. An output from the OR gate 41 is inputted to the other input terminal of the OR gate 42, and an output from the OR gate 42 is outputted through the signal line $L_1$.

Therefore, a high level signal indicative of a demand for switching from the four-wheel drive state to the two-wheel drive state is transmitted through the signal line $L_1$ to the drive-state switching control unit 4, when the vehicle is in the four-wheel drive state during non-execution of the ABS control and it has been detected by the first detecting means 38 that the four wheels are about to gradually fall into the locked states, as well as when the ABS control is executed.

The output from the second detecting means 39 is inputted to the AND gate 44, A signal from the signal line $L_2$ is inverted in the inverter 45 and inputted to the AND gate 44, and outputs from the judging means 40 and the OR gate 41 are also inputted to the AND gate 44.

The signal line $L_2$ transmits a signal indicative of the completion of the switching from the four-wheel drive state to the two-wheel drive state from the drive-state switching control unit 4 to the antilock brake control unit 17. When the switching to the two-wheel drive state is not completed, a high level signal is supplied from the inverter 45 to the AND gate 44.

The judging means 40 judges whether the output $\alpha'$ from the acceleration/deceleration calculating means 24 is low. When the output $\alpha'$ is of a low level, the judging means 40 outputs a high level signal.

Therefore, the AND gate 44 outputs a high level signal, when the second detect means 39 detects that the four wheels are about to gradually fall into the locked states, in a condition in which the vehicle is in the ABS controlled state and the switching to the two-wheel drive state is not carried out in the drive-state switching control unit 4 and in which the output α' is of a low level. An output signal from the AND gate 44 is inputted commonly to the calculating means $32_{FL}$, $32_{FR}$, $32_{RL}$ and $32_{RR}$.

The calculating means $32_{FL}$, $32_{FR}$, $32_{RL}$ and $32_{RR}$ independently calculate the locking tendencies of the wheels $W_{FL}$, $W_{FR}$, $W_{RL}$ and $W_{RR}$ during braking operation according to a predetermined calculating expression on the basis of the estimated vehicle speeds $V_{RFL}$, $V_{RFR}$, $V_{RRL}$ and $V_{RRR}$ independently determined in the vehicle speed estimating means $29_{FL}$, $29_{FR}$, $29_{RL}$ and $29_{RR}$, the wheel speeds $V_{WFL}$, $V_{WFR}$, $V_{WRL}$ and $V_{WRR}$ independently determined in the wheel speed sensors $29_{FL}$, $20_{FR}$, $20_{RL}$ and $20_{RR}$, and the signal received from the AND gate 44.

Calculating expressions in which a locking tendency of the wheel $W_{FL}$ is predetermined have been prepared in the calculating means $32_{FL}$, $32_{FR}$, $32_{RL}$ and $32_{RR}$ on the basis of the estimated vehicle speeds $V_{RFL}$, $V_{RFR}$, $V_{RRL}$ and $V_{RRR}$, the wheel speeds $V_{WFL}$, $V_{WFR}$, $V_{WRL}$ and $V_{WRR}$ and wheel accelerations or decelerations α provided by differentiation of the wheel speeds $V_{WFL}$, $V_{WFR}$, $V_{WRL}$ and $V_{WRR}$. on the basis of the received estimated vehicle speeds $V_{RFL}$, $V_{RFR}$, $V_{RRL}$ and $V_{RRR}$ and the received wheel speeds $V_{WFL}$, $V_{WFR}$, $V_{WRL}$ and $V_{WRR}$ the calculating means $32_{FL}$, $32_{FR}$, $32_{RL}$ and $32_{RR}$, each outputting, a signal indicative of a degree of locking tendency of each of the wheels $W_{FL}$, $W_{FR}$, $W_{RL}$ and $W_{RR}$.

Moreover, when the calculating means $32_{FL}$, $32_{FR}$, $32_{RL}$ and $32_{RR}$ receive the high level signal from the AND gate 44, they change the calculating expressions in a procedure as described below in order to prevent the four wheels from gradually falling into their locked states.

Each of the calculating expressions is changed such that until 100 m sec is lapsed from the time point when each of the calculating means $32_{FL}$, $32_{FR}$, $32_{RL}$ and $32_{RR}$ receives the high level signal from the AND gate 44, the amount of pressure reduced becomes larger than the degree of reduction in pressure at that time in accordance to the wheel acceleration/deceleration α, i.e., such that the locking tendency is increased.

The calculated value of the locking tendency of each wheel is maintained, until 100 m sec is further lapsed from the time point when 100 m sec has been lapsed from the time of reception of the high level signal by each of the calculating means $32_{FL}$, $32_{FR}$, $32_{FR}$ and $32_{RR}$ from the AND gate 44. When the output from the AND gate 44 changes to a low level during that time, the control of change of calculating expressions is immediately discontinued.

The operation of one of the calculating means $32_{FL}$, $32_{FR}$, $32_{RL}$ and $32_{RR}$, for example, for the left front wheel, is as shown in FIG. 11. At a time point $t_1$, the control with a large amount of pressure reduction is stopped as a result of the release of a condition in which the four wheels are about to gradually fall into the locked states. At a time point $t_2$, the control which increases an amount of reduction in pressure is stopped because of a time-over as a result of the lapse of 200 m sec from the start of such control.

The operation of this embodiment will be described below. In the correcting means 25, when it is determined that the vehicle is traveling at a substantially constant speed for a long period of time, for example, 30 seconds, the first correction amount $C_1$ is determined as a deviation of the average value $α_{AV}$ of the outputs from the longitudinal acceleration/deceleration sensor 19 from the average value of the amounts of variation in wheel speed $V_{WFL}$ for such long period of time of 30 seconds. When it is determined that the vehicle is traveling at a substantially constant speed for a relatively short period of time, for example, 500 m sec, the second correction amounts $C_{20}$ to $C_{260}$ following the variation in slope are calculated as deviations of the average values $α_0$ to $α_{60}$ of the outputs from the longitudinal acceleration/deceleration sensor 19 from the average values $VG_0$ to $VG_{60}$ of the amounts in variation in wheel speed $V_{WFL}$ for such short period of time. Then, the zero point of the longitudinal acceleration/deceleration sensor 19 is corrected by the first correction amount $C_1$, and the offset value $S_0$ is corrected by the second correction amounts $C_{20}$ to $C_{260}$. This causes the offset value $S_0$ for calculation in the acceleration/deceleration calculating means 24, to be set at a small value. Therefore, in calculating the estimated vehicle speeds $V_{RFL}$, $V_{RFR}$, $V_{RRL}$ and $V_{RRR}$, the longitudinal acceleration/deceleration α' of the vehicle can be used as a value nearer an actual value, which contributes to an improvement in control accuracy.

The monitored estimated vehicle speed $G_{VR4L}$ is determined on the basis of the highest wheel speed $V_{W4H}$ which is highest one of the wheel speeds $V_{WFL}$, $V_{WFR}$, $V_{WRL}$ and $V_{WRR}$ of the wheels $W_{FL}$, $W_{FR}$, $W_{RL}$ and $W_{RR}$, and the detection value detected by the longitudinal acceleration/deceleration sensor 19. When the highest vehicle speed $V_{RSH}$ which is the highest one of the vehicle speeds $V_{RFL}$, $V_{RFR}$, $V_{RRL}$ and $V_{RRR}$ becomes equal to or lower than the first judgement speed $G_{VR1}$, which is set lower than the monitored estimated vehicle speed $G_{VR4L}$ it is determined that the four wheels are about to fall into their locked states and the first detecting means 38 outputs the high level signal.

Thus, the signal indicative of the demand for switching to the two-wheel drive state is outputted from the OR gate 43 to the signal line $L_1$. When the drive-state switching control unit 4 has received the switching demand signal, it controls the operation of the actuator 3, such that the front wheels $W_{FL}$ and $W_{FR}$ and the rear wheels $W_{RL}$ and $W_{RR}$ are disconnected from each other to provide the two-wheel drive state in which only the front wheels $W_{FL}$ and $W_{FR}$ act as driving wheels. Therefore, the four-wheel arresting force in the four-wheel drive state is released. Thus, the braking force for the rear wheels becomes small because the brake depression force is small from the beginning, and hence, the wheel speeds $V_{WRL}$ and $W_{WRR}$ of the rear wheels approach an actual vehicle speed and as a result, an ABS control range is entered, thereby preventing the four wheels from gradually falling into the locked states.

During execution of the ABS control, the signal indicative of the demand for switching to the two-wheel drive state is outputted from the antilock brake control unit 17 to the signal line $L_1$. However, when such switching demand signal is not inputted to the drive-state switching control unit 4 due to a breaking of the signal line $L_1$ or the other reason, or when the switching from the four-wheel drive state to the two-wheel drive state is not performed due to any trouble in the variable differential operation limiting device 2 or the other reason, and the ABS control is carried out while maintaining the four-wheel drive state, the four wheels may gradually fall into the locked states. However, when the highest estimated vehicle speed $V_{R4H}$ becomes equal to or lower than the second judgement speed $G_{VR2}$ set lower than the monitored estimated vehicle speed $G_{VR4L}$, the second detecting means 39 detects that the four wheels are about to fall into the locked states, thereby outputting the high level signal. Moreover, when a signal indicative of a completion of the switching to the two-wheel drive state is not inputted to the calculating means $32_{FL}$, $32_{FR}$, $32_{RL}$ and $32_{RR}$ through the signal line $L_2$, they change the calculating expressions, so that a reduction in pressure can be obtained with an amount larger than the degree of reduction in pressure. This enables the estimated vehicle speeds $V_{RFL}$, $V_{RFR}$, $V_{RRL}$ and $V_{RRR}$ to approach an actual vehicle speed.

Further, when the spinning of the four wheels is detected by the four-wheel spin detecting means 37 during non-execution of the ABS control, the estimated vehicle speeds $V_{RFL}$, $V_{RFR}$, $V_{RRL}$ and $V_{RRR}$ are determined in the vehicle speed estimating means $29_{FL}$, $29_{FR}$, $29_{RL}$ and $29_{RR}$, using the value resulting from subtraction of the offset value $S_0$ from the output $\alpha'$ from the acceleration/deceleration calculating means 24, i.e., the output $\alpha$ from the longitudinal acceleration/deceleration sensor 19. Therefore, an increase in the estimated vehicle speed in the four-wheel spinning state is avoided and hence, the ABS is not unnecessarily executed, thereby preventing the generation of an operational noise attendant on the unnecessary execution of the ABS control.

In the above-described embodiment, during execution of the ABS control, the signal indicative of the completion of the switching to the two-wheel drive state is not supplied from the drive-state switching control unit 4 through the signal line $L_2$ to the antilock brake control unit 17. And when it has been detected that the four wheels are about to gradually fall into locked states, the pressure-reducing control in which the braking pressure is further reduced is carried out. Alternatively, when the signal indicative of the completion of the switching to the two-wheel drive state is not supplied from the drive-state switching control unit 4 through the signal line $L_2$ to the antilock brake control unit 17 during execution of the ABS control, the pressure-reducing control in which the braking pressure is further reduced may be immediately carried out. Even in such a case, the four wheels can be prevented from gradually falling into the locked states as a result of the execution of the antilock brake control while maintaining the four-wheel drive state.

Although the embodiment of the present invention has been described in detail, it will be understood that the present invention is not limited to the above-described embodiment, and various modifications in design may be made without departing from the spirit and scope of the invention defined in claims.

What is claimed is:

1. A method for controlling the driving state of a vehicle switchable between a four-wheel drive state and a two-wheel drive state and having an antilock brake control system, during braking of the vehicle for eliminating a locking tendency of a wheel, said method comprising the steps of:

(a) sensing the speed of each of the vehicle wheels;
    (b) sensing the longitudinal acceleration/deceleration of the vehicle;
    (c) calculating a monitored estimated vehicle speed based upon the highest of the sensed wheel speeds and the sensed longitudinal acceleration/deceleration;
    (d) determining a judgement speed having a value lower than the monitored estimated vehicle speed;
    (e) calculating a vehicle speed based upon each of the sensed wheel speeds, respectively;
    (f) comparing the highest calculated vehicle speed to the judgement speed; and
    (g) switching the drive state of the vehicle from four-wheel drive to two-wheel drive when the highest calculated vehicle speed is equal to or less than the judgement speed when the vehicle is in a four-wheel drive state.

2. A method as set forth in claim 1, wherein said drive state is switched from four-wheel drive to two-wheel drive when the highest calculated vehicle speed is equal to or less than the judgement speed for longer than a predetermined period of time.

3. A method for controlling the driving state of a vehicle switchable between a four-wheel drive state and a two-wheel drive state and having an antilock brake control system, during braking of the vehicle for eliminating a locking tendency of a wheel, said method comprising the steps of:

(a) sensing the speed of each of the vehicle wheels;
    (b) sensing the longitudinal acceleration/deceleration of the vehicle;
    (c) calculating a monitored estimated vehicle speed based upon the highest of the sensed wheel speeds and the sensed longitudinal acceleration/deceleration;
    (d) determining a judgement speed having a value lower than the monitored estimated vehicle speed;
    (e) calculating a vehicle speed based upon each of the sensed wheel speeds, respectively;
    (f) comparing the highest calculated vehicle speed to the judgement speed; and
    (g) reducing the braking pressure in the antilock brake control system when the highest calculated vehicle speed is equal to or less than the judgement speed and the antilock brake control system is braking the vehicle.

4. A method of controlling the driving state of a vehicle during antilock braking of the vehicle, comprising the steps of applying antilock brake control while the vehicle is in a four-wheel driving state, wherein the braking pressure is reduced in the antilock brake control; determining if the vehicle wheels begin to lock while the vehicle is in the four-wheel driving state; and switching the driving state from a four-wheel driving state to a two-wheel driving state when it is determined that the wheels are beginning to lock.

* * * * *